(12) United States Patent
Schroth et al.

(10) Patent No.: US 8,163,399 B2
(45) Date of Patent: Apr. 24, 2012

(54) DAMPED PRODUCTS AND METHODS OF MAKING AND USING THE SAME

(75) Inventors: James G. Schroth, Troy, MI (US); Michael D. Hanna, West Bloomfield, MI (US); Richard H. Hammar, Utica, MI (US); Omar S. Dessouki, Beverly Hills, MI (US); Brent D. Lowe, Milford, MI (US); Mark T. Riefe, Brighton, MI (US); Mohan Sundar, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1071 days.

(21) Appl. No.: 12/025,967

(22) Filed: Feb. 5, 2008

(65) Prior Publication Data

US 2008/0185249 A1 Aug. 7, 2008

Related U.S. Application Data

(63) Continuation-in-part of application No. 11/780,828, filed on Jul. 20, 2007, now abandoned, and a continuation-in-part of application No. 11/475,759, filed on Jun. 27, 2006, now Pat. No. 7,644,750, and a continuation-in-part of application No. 10/961,813, filed on Oct. 8, 2004, now Pat. No. 7,975,750, and a continuation-in-part of application No. 11/475,756, filed on Jun. 27, 2006, now Pat. No. 7,937,819, and a continuation-in-part of application No. 11/440,916, filed on May 25, 2006, now Pat. No. 7,775,332, and a continuation-in-part of application No. 11/554,234, filed on Oct. 30, 2006.

(60) Provisional application No. 60/718,945, filed on Sep. 20, 2005, provisional application No. 60/718,579, filed on Sep. 19, 2005, provisional application No. 60/717,310, filed on Sep. 15, 2005.

(51) Int. Cl.
| | |
|---|---|
| *B32B 7/04* | (2006.01) |
| *B32B 11/02* | (2006.01) |
| *B32B 15/16* | (2006.01) |
| *B32B 15/14* | (2006.01) |

(52) U.S. Cl. ........ 428/591; 428/609; 428/612; 428/614; 428/143

(58) Field of Classification Search ....................... None
See application file for complete search history.

(56) References Cited

U.S. PATENT DOCUMENTS 974,024 A    10/1910   Carter
(Continued)

FOREIGN PATENT DOCUMENTS

CH    428319    1/1967
(Continued)

OTHER PUBLICATIONS

Chinese First Office Action; CN200510113784.X; Dated May 18, 2007; 19 pages.

(Continued)

*Primary Examiner* — John J Zimmerman
(74) *Attorney, Agent, or Firm* — BrooksGroup

(57) ABSTRACT

Various embodiments of the invention include products and parts including a frictional damping means and methods of making and using the same.

60 Claims, 10 Drawing Sheets

U.S. PATENT DOCUMENTS

| | | | |
|---|---|---|---|
| 1,484,421 A | 2/1924 | Thomspon | |
| 1,989,211 A | 1/1935 | Norton | |
| 2,012,838 A | 8/1935 | Tilden | |
| 2,026,878 A | 1/1936 | Farr | |
| 2,203,727 A * | 6/1940 | Herbst | 200/241 |
| 2,288,438 A | 6/1942 | Dach | |
| 2,603,316 A | 7/1952 | Pierce | |
| 2,978,793 A | 4/1961 | Lamson et al. | |
| 3,085,391 A | 4/1963 | Hatfield et al. | |
| 3,127,959 A | 4/1964 | Wengrowski | |
| 3,147,828 A | 9/1964 | Hunsaker | |
| 3,292,746 A | 12/1966 | Robinette | |
| 3,378,115 A | 4/1968 | Stephens, III | |
| 3,425,523 A | 2/1969 | Robinette | |
| 3,494,884 A * | 2/1970 | Kraft | 523/159 |
| 3,509,973 A | 5/1970 | Kimata | |
| 3,575,270 A | 4/1971 | Wagenfuhrer et al. | |
| 3,774,472 A | 11/1973 | Mitchell | |
| 3,841,448 A | 10/1974 | Norton, Jr. | |
| 3,975,894 A | 8/1976 | Suzuki | |
| 4,049,085 A | 9/1977 | Blunier | |
| 4,072,219 A | 2/1978 | Hahm et al. | |
| 4,195,713 A | 4/1980 | Hagbjer et al. | |
| 4,250,950 A | 2/1981 | Buxmann et al. | |
| 4,277,113 A * | 7/1981 | Heshmat | 384/124 |
| 4,278,153 A | 7/1981 | Venkatu | |
| 4,338,758 A | 7/1982 | Hagbjer | |
| 4,379,501 A | 4/1983 | Hagiwara et al. | |
| 4,475,634 A | 10/1984 | Flaim et al. | |
| 4,516,658 A * | 5/1985 | Scarton et al. | 181/208 |
| 4,523,666 A | 6/1985 | Murray | |
| 4,529,079 A | 7/1985 | Albertson | |
| 4,778,730 A * | 10/1988 | Zucker | 428/552 |
| 4,905,299 A | 2/1990 | Ferraiuolo et al. | |
| 5,004,078 A | 4/1991 | Oono et al. | |
| 5,025,547 A | 6/1991 | Sheu et al. | |
| 5,083,643 A | 1/1992 | Hummel et al. | |
| 5,115,891 A | 5/1992 | Raitzer et al. | |
| 5,139,117 A | 8/1992 | Melinat | |
| 5,143,184 A | 9/1992 | Snyder et al. | |
| 5,183,632 A | 2/1993 | Kluchi et al. | |
| 5,184,662 A | 2/1993 | Quick et al. | |
| 5,259,486 A | 11/1993 | Deane | |
| 5,310,025 A | 5/1994 | Anderson | |
| 5,416,962 A | 5/1995 | Passarella | |
| 5,417,313 A | 5/1995 | Matsuzaki et al. | |
| 5,509,510 A | 4/1996 | Ihm | |
| 5,530,213 A | 6/1996 | Hartsock et al. | |
| 5,558,317 A * | 9/1996 | Nels | 267/156 |
| 5,582,231 A | 12/1996 | Siak et al. | |
| 5,620,042 A | 4/1997 | Ihm | |
| 5,660,251 A | 8/1997 | Nishizawa et al. | |
| 5,697,359 A * | 12/1997 | Okanishi et al. | 125/15 |
| 5,789,066 A | 8/1998 | DeMare et al. | |
| 5,819,882 A | 10/1998 | Reynolds et al. | |
| 5,855,257 A | 1/1999 | Wickert et al. | |
| 5,862,892 A | 1/1999 | Conley | |
| 5,878,843 A | 3/1999 | Saum | |
| 5,915,503 A * | 6/1999 | Enright | 188/67 |
| 5,927,447 A | 7/1999 | Dickerson | |
| 5,965,249 A | 10/1999 | Sutton et al. | |
| 6,047,794 A | 4/2000 | Nishizawa | |
| 6,073,735 A | 6/2000 | Botsch et al. | |
| 6,112,865 A | 9/2000 | Wickert et al. | |
| 6,119,548 A * | 9/2000 | Murphy | 74/570.2 |
| 6,206,150 B1 | 3/2001 | Hill | |
| 6,216,827 B1 | 4/2001 | Ichiba et al. | |
| 6,223,866 B1 | 5/2001 | Giacomazza | |
| 6,231,456 B1 | 5/2001 | Rennie et al. | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 | 3/2002 | DiPonio | |
| 6,405,839 B1 | 6/2002 | Ballinger et al. | |
| 6,413,622 B1 * | 7/2002 | Kobayashi | 428/293.1 |
| 6,465,110 B1 | 10/2002 | Boss et al. | |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,543,518 B1 | 4/2003 | Bend et al. | |
| 6,648,055 B1 | 11/2003 | Haug et al. | |
| 6,799,664 B1 | 10/2004 | Connolly | |
| 6,802,405 B2 * | 10/2004 | Barcock et al. | 188/268 |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 6,945,309 B2 | 9/2005 | Frait et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,293,755 B2 | 11/2007 | Miyahara et al. | |
| 7,594,568 B2 | 9/2009 | Hanna et al. | |
| 7,604,098 B2 | 10/2009 | Dessouki et al. | |
| 7,644,750 B2 | 1/2010 | Schroth et al. | |
| 7,775,332 B2 | 8/2010 | Hanna et al. | |
| 7,823,763 B2 * | 11/2010 | Sachdev et al. | 228/112.1 |
| 7,836,938 B2 | 11/2010 | Agarwal et al. | |
| 7,938,378 B2 * | 5/2011 | Hanna et al. | 248/634 |
| 7,950,441 B2 * | 5/2011 | Hanna et al. | 164/112 |
| 2002/0084156 A1 | 7/2002 | Ballinger et al. | |
| 2002/0104721 A1 | 8/2002 | Schaus et al. | |
| 2002/0121792 A1 * | 9/2002 | Worthington | 294/160 |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2006/0076200 A1 | 4/2006 | Dessouki et al. | |
| 2006/0243547 A1 | 11/2006 | Keller | |
| 2007/0039710 A1 | 2/2007 | Newcomb | |
| 2007/0056815 A1 | 3/2007 | Hanna et al. | |
| 2007/0062664 A1 | 3/2007 | Schroth et al. | |
| 2007/0062768 A1 | 3/2007 | Hanna et al. | |
| 2007/0142149 A1 | 6/2007 | Kleber | |
| 2007/0166425 A1 | 7/2007 | Utsugi | |
| 2007/0235270 A1 | 10/2007 | Miskinis et al. | |
| 2007/0298275 A1 | 12/2007 | Carter et al. | |
| 2008/0099289 A1 | 5/2008 | Hanna et al. | |
| 2008/0185249 A1 | 8/2008 | Schroth et al. | |
| 2009/0032569 A1 | 2/2009 | Sachdev et al. | |
| 2009/0107787 A1 | 4/2009 | Walker et al. | |

FOREIGN PATENT DOCUMENTS

| | | |
|---|---|---|
| CN | 2005/10113784 | 10/2005 |
| CN | 1757948 A | 4/2006 |
| CN | 2863313 Y | 1/2007 |
| DE | 24 46 938 | 4/1976 |
| DE | 25 37 038 | 3/1977 |
| DE | 19649919 A1 | 6/1998 |
| DE | 199 48 009 | 3/2001 |
| DE | 60000008 T2 | 3/2002 |
| DE | 101 41 698 | 3/2003 |
| DE | 102005048258.9 | 10/2005 |
| DE | 60116780 T2 | 11/2006 |
| EP | 0 205 713 | 12/1986 |
| GB | 1230 274 | 4/1971 |
| GB | 2328952 | 3/1999 |
| JP | 57154533 | 9/1982 |
| JP | 1126434 U1 | 8/1989 |
| JP | 1-240702 * | 9/1989 |
| JP | 2-76936 * | 3/1990 |
| JP | 5-062443 * | 3/1993 |
| JP | 05-104567 | 4/1993 |
| JP | 10-002011 * | 1/1998 |
| JP | 11342461 A | 12/1999 |
| JP | 2003214465 A | 7/2003 |
| JP | 2004011841 A | 1/2004 |

| | | | |
|---|---|---|---|
| KR | 20010049837 A | | 6/2001 |
| SU | 1247530 | * | 7/1986 |
| WO | WO 98/23877 | | 6/1998 |
| WO | WO 01/36836 | | 5/2001 |
| WO | 2007035206 A2 | | 3/2007 |

OTHER PUBLICATIONS

Chinese Second Office Action; CN200510113784.X; Dated Feb. 15, 2008; 13 pages.
German Examination Report; DE102005048258.9-12; Dated Oct. 22, 2007; 8 pages.
Gerdemann, Steven J,; Titanium Process Technologies; Advanced Materials & Processes, Jul. 2001, pp. 41-43.
Mahoney, M. W. & Lynch S. P.; Friction-Stir Processing; 15 pages.
MPIF: All You Need to Know about Powder Metallurgy; http://www.mpif.org/IntroPM/IntroPM/asp?linkid=1; 8 pages.
Powder Metallurgy—Wikipedia article; http://en.wikipedia.org/wiki/Powder_metallurgy; 5 pages.
Sintering—Wikipedia article; http://en.wikipedia.org/wiki/Sintering; 2 pages.
Magnetorheological fluid—Wikipedia article; http:en/wikipedia.org/wiki/Magnetorheological_fluid.
PCT/US2008/087354 Written Opinion and Search Report; Date of Mailing: Aug. 3, 2009; 9 pages.
PCT/US2009/039839 Written Opinion and Search Report; Date of Mailing: Nov. 24, 2009; 7 pages.
PCT/US2009/048424 Written Opinion and Search Report; Date of Mailing; Dec. 28, 2009; 7 pages.
U.S. Appl. No. 12/328,989, filed Dec. 5, 2008; First Named Inventor: Patrick J. Monsere.
U.S. Appl. No. 12/420,259, filed Apr. 8, 2009; First Named Inventor: Michael D. Hanna.
U.S. Appl. No. 12/434,057, filed May 1, 2009; First Named Inventor: Chongmin Kim.
U.S. Appl. No. 12/436,830, filed May 7, 2009; First Named Inventor: James G. Schroth.
U.S. Appl. No. 12/489,901, filed Jun. 23, 2009; First Named Inventor: Michael D. Hanna.
U.S. Appl. No. 12/885,813, filed Sep. 20, 2010; First Named Inventor: Michael D. Hanna.
International Search Report dated Apr. 2, 2007 for International Application No. PCT US06/29687, Publication No. WO 2007/040768; GM Global Technology Operations, Inc.
Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.
Z. Wu, C. Richter, L. Menon, A Study of Anodization Process During Pore Formation in Nanoporous Alumina Templates, Journal of the Electrochemical Society, vol. 154, 2007.
W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-B505.
I.V. Sieber, P. Schmuki, Porous Tantalum Oxide Prepared by Electrochemical Anodic Oxidation, Journal of the Electrochemical Society, vol. 152, 2005, pp. C639-C644.
H. Tanaka, A. Shimada, A. Kinoshita, In situ Measurement of the Diameter of Nanopores in Silicon During Anodization in Hydrofluoric Acid Solution, Journal of the Electrochemic.
L.G. Hector, Jr., S. Sheu, Focused Energy Beam Work Roll Surface Texturing Science and Technology, Journal of Materials Processing & Manufacturing Science, vol. 2, Jul. 1993.
P.N. Anyalebechi, Ungrooved Mold Surface Topography Effects on Cast Subsurface Microstructure, Materials Processing Fundamentals, TMS 2007, pp. 49-62.
F. Yigit, Critical Wavelengths for Gap Nucleation in Solidification—Part 1: Theoretical Methodology, Journal of Applied Mechanics, vol. 67, Mar. 2000, pp. 66-76.
P.N. Anyalebechi, Undulatory Solid Shell Growth of Aluminum Alloy 3003 as a Function of the Wavelength of a Grooved Mold Surface Topography, TMS 2007, pp. 31-47.
Dessouki et al., U.S. Appl. No. 10/961,813, Coulumb friction damped disc brake rotors, filed Oct. 8, 2004.
Hanna et al., U.S. Appl. No. 11/475,756, Bi-metal disc brake rotor and method of manufacturing, filed Jun. 27, 2006.
Schroth et al., U.S. Appl. No. 11/475,759, Method of casting components with inserts for noise reduction, filed Jun. 27, 2006.
Hanna et al., U.S. Appl. No. 11/440,916, Bi-metal disc brake rotor and method of manufacture, filed May 25, 2006.
Hanna et al., U.S. Appl. No. 11/554,234, Coulomb damped disc brake rotor and method of manufacturing, filed Oct. 30, 2006.
Walker et al., U.S. Appl. No. 11/926,798, Inserts with holes for damped products and methods of making and using the same, filed Oct. 29, 2007.
Hanna et al., U.S. Appl. No. 11/832,401, Damped product with insert and method of making the same, filed Aug. 1, 2007.
Kleber, et al., U.S. Appl. No. 11/848,732, Cast-in-place torsion joint, filed Aug. 31, 2007.
Hanna et al., U.S. Appl. No. 11/780,679, Method of manufacturing a damped part, filed Jul. 20, 2007.
Aase et al., U.S. Appl. No. 11/969,259, Method of forming casting with frictional damping insert, filed Jan. 4, 2008.
Hanna et al., U.S. Appl. No. 12/165,729, Method for securing an insert in the manufacture of a damped part, filed Jul. 1, 2008.
Hanna et al., U.S. Appl. No. 12/165,731, Product with metallic foam and method of manufacturing the same, filed Jul. 1, 2008.
Agarwal et al., U.S. Appl. No. 11/860,049, Insert with tabs and damped products and methods of making the same, filed Sep. 24, 2007.
Hanna et al., U.S. Appl. No. 12/174,163, Damped part, filed Jul. 16, 2008.
Hanna et al., U.S. Appl. No. 12/174,223, Method of casting damped part with insert, filed Jul. 16, 2008.
Hanna et al., U.S. Appl. No. 12/183,180, Casting noise-damped, vented brake rotors with embedded inserts, filed Jul. 31, 2008.
Hanna et al., U.S. Appl. No. 12/183,104, Low mass multi-piece sound damped article, filed Jul. 31, 2008.
Golden et al., U.S. Appl. No. 12/105,411, Insert with filler to dampen vibrating components, filed Apr. 18, 2008.
Hanna et al., U.S. Appl. No. 11/440,893, Rotor assembly and method, filed May 25, 2006.
Carter, U.S. Appl. No. 11/680,179, Damped automotive components with cast in place inserts and method of making same, filed Feb. 28, 2007.
Ulicny et al., U.S. Appl. No. 12/105,438, Filler material to dampen vibrating components, filed Apr. 18, 2008.
Hanna et al., U.S. Appl. No. 12/272,164, Surface configurations for damping inserts, filed Nov. 17, 2008.
Hanna et al., U.S. Appl. No. 12/145,169, Damped product with an insert having a layer including graphite thereon and methods of making and using the same, filed Jun. 24, 2008.
Lowe et al., U.S. Appl. No. 12/174,320, Damped part with insert, filed Jul. 16, 2008.
Xia, U.S. Appl. No. 12/858,596, Lightweight brake rotor and components with composite materials, filed Sep. 20, 2007.
Dessouki et al., U.S. Appl. No. 12/178,872, Friction damped brake drum, filed Jul. 24, 2008.
Sachdev et al., U.S. Appl. No. 11/832,356, Friction welding method and products made using the same, filed Aug. 1, 2007.

* cited by examiner

DAMPED PRODUCTS AND METHODS OF MAKING AND USING THE SAME

CROSS-REFERENCE TO RELATED APPLICATIONS

This is a continuation-in-part of U.S. patent application Ser. No. 11/780,828, filed Jul. 20, 2007 (now abandoned), a continuation-in-part of U.S. patent application Ser. No. 11/475,759, filed Jun. 27, 2006 (now U.S. Pat. No. 7,644, 750), which claims the benefit of U.S. Provisional Application No. 60/718,945, filed Sep. 20, 2005; and a continuation-in-part of U.S. patent application Ser. No. 10/961,813, filed Oct. 8, 2004 (now U.S. Pat. No. 7,975,750), and a continuation-in-part of U.S. patent application Ser. No. 11/475,756, filed Jun. 27, 2006 now U.S. Pat. No. 7,937,819 which claims the benefit of U.S. Provisional Application No. 60/718,579, filed Sep. 19, 2005; a continuation-in-part of U.S. patent application Ser. No. 11/440,916, filed May 25, 2006 (now U.S. Pat. No. 7,775,332), which claims the benefit of U.S. Provisional Application No. 60/717,310, filed Sep. 15, 2005; a continuation-in-part of U.S. patent application Ser. No. 11/554,234, filed Oct. 30, 2006.

TECHNICAL FIELD

The field to which the disclosure generally relates includes products and components thereof including means for damping and methods of making and using the same.

BACKGROUND

Product parts may produce undesirable noise when vibrated, or may vibrate at an undesirable amplitude for an prolonged period when struck or set in motion.

SUMMARY OF EXEMPLARY EMBODIMENTS OF THE INVENTION

Various embodiments of the invention include products and parts including a frictional damping means and methods of making and using the same.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

Figure 1:
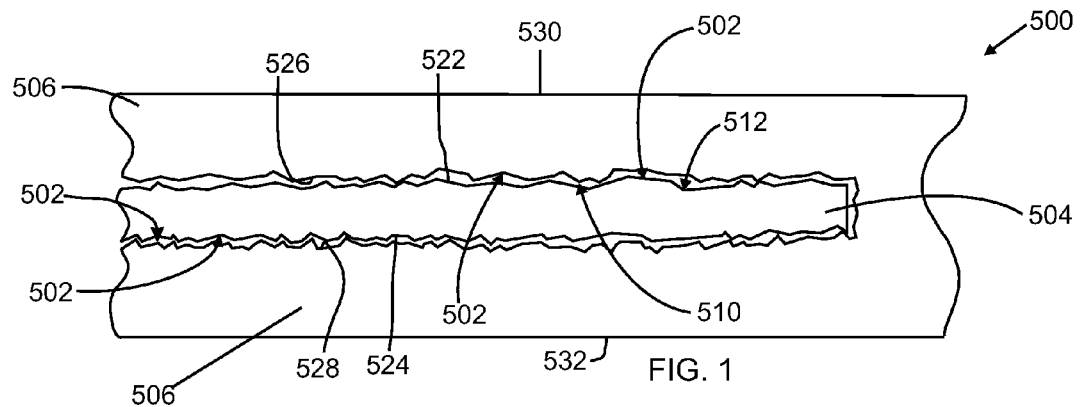
FIG. 1 is a sectional view with portions broken away of one embodiment of the invention including an insert.

The following description of the embodiment(s) is merely exemplary in nature and is in no way intended to limit the invention, its application, or uses.

Referring to FIGS. 1-16, one embodiment of the invention includes a product or part 500 having a frictional damping means. The frictional damping means may be used in a variety of applications including, but not limited to, applications where it is desirable to reduce noise associated with a vibrating part or reduce the vibration amplitude and/or duration of a part that is struck, dynamically loaded, excited, or set in motion. In one embodiment the frictional damping means may include an interface boundary conducive to frictionally damping a vibrating part. In one embodiment the damping means may include frictional surfaces 502 constructed and arranged to move relative to each other and in frictional contact, so that vibration of the part is dissipated by frictional damping due to the frictional movement of the surfaces 502 against each other.

According to various illustrative embodiments of the invention, frictional damping may be achieved by the movement of the frictional surfaces 502 against each other. The movement of frictional surfaces 502 against each other may include the movement of: surfaces of the body 506 of the part against each other; a surface of the body 506 of the part against a surface of the insert 504; a surface of the body 506 of the part against the layer 520; a surface of the insert 504 against the layer 520; a surface of the body 506 of the part against the particles 514 or fibers; a surface of the insert 504 against the particles 514 or fibers; or by frictional movement of the particles 514 or fibers against each other or against remaining binder material.

In embodiments wherein the frictional surface 502 is provided as a surface of the body 506 or the insert 504 or a layer 520 over one of the same, the frictional surface 502 may have a minimal area over which frictional contact may occur that may extend in a first direction a minimum distance of 0.1 mm and/or may extend in a second (generally traverse) direction a minimum distance of 0.1 mm. In one embodiment the insert 504 may be an annular body and the area of frictional contact on a frictional surface 502 may extend in an annular direction a distance ranging from about 20 mm to about 1000 mm and in a transverse direction ranging from about 10 mm to about 75 mm. The frictional surface 502 may be provided in a variety of embodiments, for example, as illustrated in FIGS. 1-16.

Referring again to FIG. 1, in another embodiment of the invention one or more of the outer surfaces 522, 524 of the insert 504 or surfaces 526, 528 of the body 506 of the part 500 may include a relatively rough surface including a plurality of peaks 510 and valleys 512 to enhance the frictional damping of the part. In one embodiment, the surface of the insert 504 or the body 506 may be abraded by sandblasting, glass bead blasting, water jet blasting, chemical etching, machining or the like.

Figure 2:
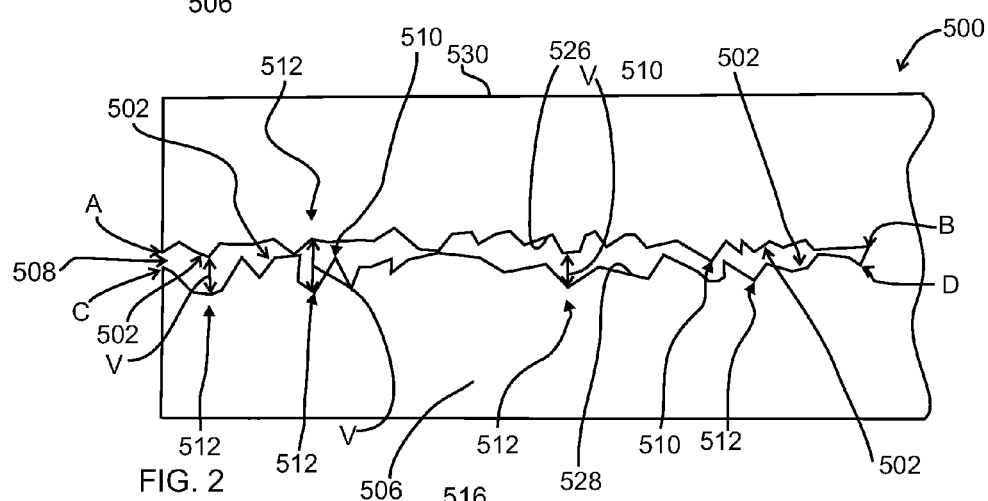
FIG. 2 is a sectional view with portions broken away of one embodiment of the invention including two spaced apart frictional surfaces of a cast metal body portion.

As shown in FIG. 2, in one embodiment one frictional surface 502 (for example extending from points A-B) may be a first surface of the body 506 of the part 500 positioned adjacent to a second frictional surface 502 (for example extending from points C-D) of the body 506. The body 506 may include a relatively narrow slot-like feature 508 formed therein so that at least two of the frictional surfaces 502 defining the slot-like feature 508 may engage each other for frictional movement during vibration of the part to provide frictional damping of the part 500. In various embodiments of the invention, the slot-like feature 508 may be formed by machining the cast part, or by using a sacrificial casting insert that may be removed after the casting by, for example, etching or machining. In one embodiment a sacrificial insert may be used that can withstand the temperature of the molten metal during casting but is more easily machined than the cast metal. Each frictional surface 502 may have a plurality of peaks 510 and a plurality of valleys 512. The depth as indicated by line V of the valleys 512 may vary with embodiments. In various embodiments, the average of the depth V of the valleys 512 may range from about 1 μm-300 μm, 50 μm-260 μm, 100 μm-160 μm or variations of these ranges. However, for all cases there is local contact between the opposing frictional surfaces 502 during component operation for frictional damping to occur.

Figure 5:
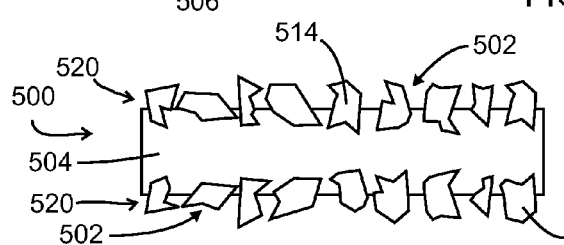
FIG. 5 is an enlarged view of one embodiment of the invention.
Figure 6:
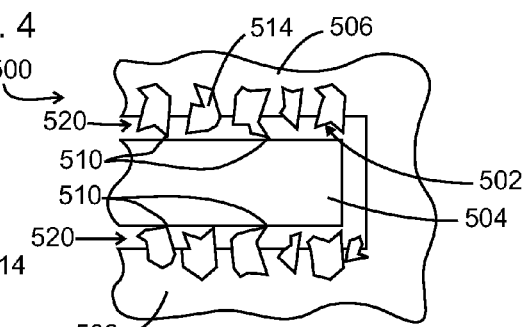
FIG. 6 is a sectional view with portions broken away of one embodiment of the invention.
Figure 7:
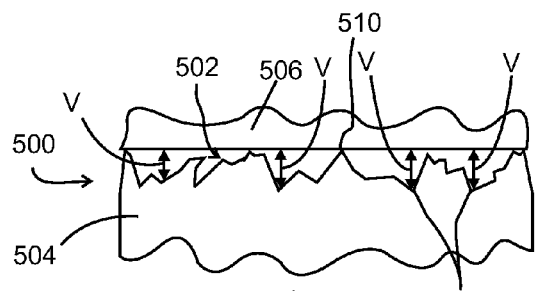
FIG. 7 is an enlarged sectional view with portions broken away of one embodiment of the invention.
Figure 8:
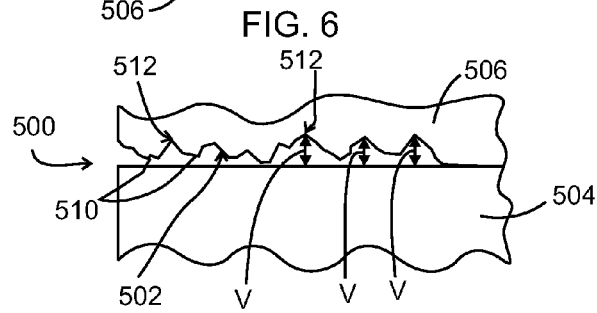
FIG. 8 is an enlarged sectional view with portions broken away of one embodiment of the invention.
Figure 9:
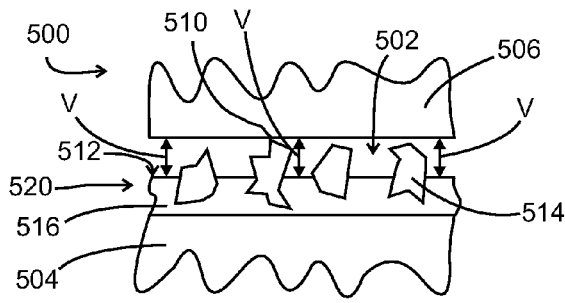
FIG. 9 is an enlarged sectional view with portions broken away of one embodiment of the invention.
Figure 10:
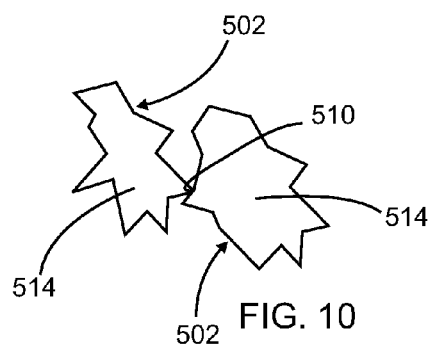
FIG. 10 illustrates one embodiment of the invention.

In another embodiment of the invention the damping means or frictional surface 502 may be provided by particles 514 or fibers provided on at least one face of the insert 504 or a surface of the body 506 of the part 500. The particles 514 may have an irregular shape (e.g., not smooth) to enhance frictional damping, as illustrated in FIG. 10. One embodiment of the invention may include a layer 520 including the particles 514 or fibers which may be bonded to each other or to a surface of the body 506 of the part or a surface of the insert 504 due to the inherent bonding properties of the particles 514 or fibers. For example, the bonding properties of the particles 514 or fibers may be such that the particles 514 or fibers may bind to each other or to the surfaces of the body 506 or the insert 504 under compression. In another embodiment of the invention, the particles 514 or the fibers may be treated to provide a coating thereon or to provide functional groups attached thereto to bind the particles together or attach the particles to at least one of a surface of the body 506 or a surface of the insert 504. In another embodiment of the invention, the particles 514 or fibers may be embedded in at least one of the body 506 of the part or the insert 504 to provide the frictional surface 502 (FIGS. 5-6).

In embodiments wherein at least a portion of the part 500 is manufactured such that the insert 504 and/or the particles 514 or fibers are exposed to the temperature of a molten material such as in casting, the insert 504 and/or particles 514 or fibers may be made from materials capable of resisting flow or resisting significant erosion during the manufacturing. For example, the insert 504 and/or the particles 514 or fibers may include refractory materials capable of resisting flow or that do not significantly erode at temperatures above 1100° F., above 2400° F., or above 2700° F. When molten material, such as metal, is cast around the insert 504 and/or the particles 514, the insert 504 or the particles 514 should not be wet by the molten material so that the molten material does not bond to the insert 504 or layer 520 at locations wherein a frictional surface 502 for providing frictional damping is desired.

Illustrative examples of suitable particles 514 or fibers include, but are not limited to, particles or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one embodiment of the invention the particles 514 may have a length along the longest dimension thereof ranging from about 1 μm-350 μm, or 10 μm-250 μm.

Figure 4:
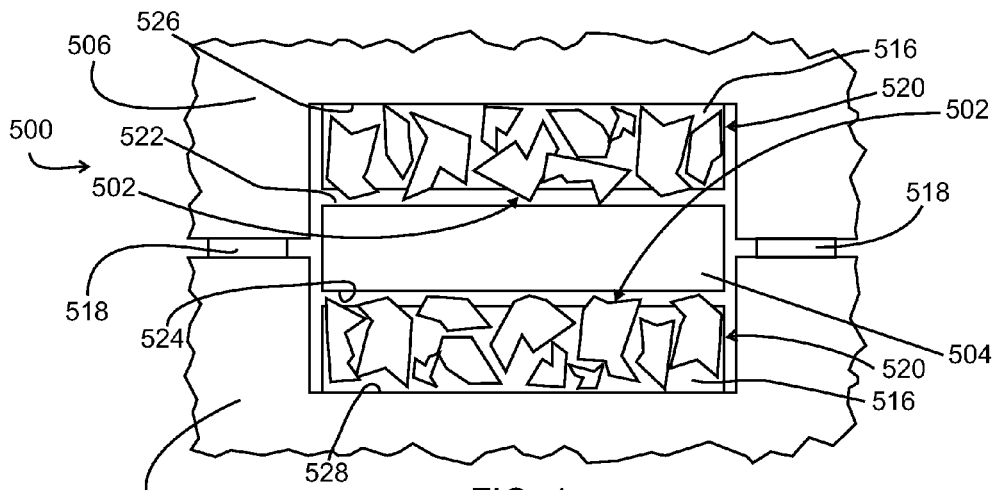
FIG. 4 is a sectional view with portions broken away of one embodiment of the invention.

In embodiments wherein the part 500 is made using a process wherein the insert 504 and/or the particles 514 or fibers are not subjected to relatively high temperatures associated with molten materials, the insert 504 and/or particles 514 or fibers may be made from a variety of other materials including, but not limited to, non-refractory polymeric materials, ceramics, composites, wood or other materials suitable for frictional damping. For example, such non-refractory materials may also be used (in additional to or as a substitute for refractory materials) when two portions of the body 506 of the part 500 are held together mechanically by a locking mechanism, or by fasteners, or by adhesives, or by welding 518, as illustrated in FIG. 4.

In another embodiment of the invention, the layer 520 may be a coating over the body 506 of the part or the insert 504. The coating may include a plurality of particles 514 which may be bonded to each other and/or to the surface of the body 506 of the part or the insert 504 by an inorganic or organic binder 516 (FIGS. 3-4, 9) or other bonding materials. Illustrative examples of suitable binders include, but are not limited to, epoxy resins, phosphoric acid binding agents, calcium aluminates, sodium silicates, wood flour, or clays. In another embodiment of the invention the particles 514 may be held together and/or adhered to the body 506 or the insert 504 by an inorganic binder. In one embodiment, the coating may be deposited on the insert 504 or body 506 as a liquid dispersed mixture of alumina-silicate-based, organically bonded refractory mix.

In another embodiment, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include IronKote. In one embodiment, a liquid coating may be deposited on a portion of the insert and may include high temperature Ladle Kote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

When the layer 520 including particles 514 or fibers is provided over the insert 504 or the body 506 of the part the thickness L (FIG. 3) of the layer 520, particles 514 and/or fibers may vary. In various embodiments, the thickness L of the layer 520, particles 514 and/or fibers may range from about 1 µm-400 µm, 10 µm-400 µm, 30 µm-300 µm, 30 µm-40 µm, 40 µm-100 µm, 100 µm-120 µm, 120 µm-200 µm, 200 µm-300 µm, 200 µm-250 µm, or variations of these ranges.

In yet another embodiment of the invention the particles 514 or fibers may be temporarily held together and/or to the surface of the insert 504 by a fully or partially sacrificial coating. The sacrificial coating may be consumed by molten metal or burnt off when metal is cast around or over the insert 504. The particles 514 or fibers are left behind trapped between the body 506 of the cast part and the insert 504 to provide a layer 520 consisting of the particles 514 or fibers or consisting essentially of the particles 514 or fibers.

Figure 3:
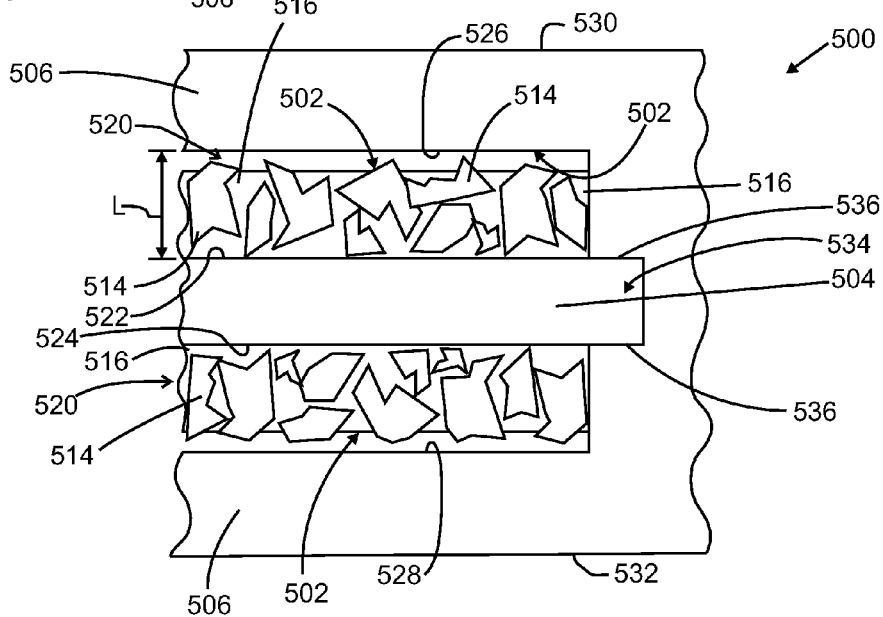
FIG. 3 is a sectional view with portions broken away of one embodiment of the invention including an insert having a layer thereon to provide a frictional surface for damping.

The layer 520 may be provided over the entire insert 504 or only over a portion thereof. In one embodiment of the invention the insert 504 may include a tab 534 (FIG. 3). For example, the insert 504 may include an annular body portion and a tab 534 extending radially inward or outward therefrom. In one embodiment of the invention at least one wettable surface 536 of the tab 534 does not include a layer 520 including particles 514 or fibers, or a wettable material such as graphite is provided over the tab 534, so that the cast metal is bonded to the wettable surface 536 to attach the insert 504 to the body 506 of the part 500 but still allow for frictional damping over the remaining insert surface which is not bonded to the casting.

In one embodiment of the invention at least a portion of the insert 504 is treated or the properties of the insert 504 are such that molten metal will not wet or bond to that portion of the insert 504 upon solidification of the molten metal. According to one embodiment of the invention at least one of the body 506 of the part or the insert 504 includes a metal, for example, but not limited to, aluminum, steel, stainless steel, cast iron, any of a variety of other alloys, or metal matrix composite including abrasive particles. In one embodiment of the invention the insert 504 may include a material such as a metal having a higher melting point than the melting point of the molten material being cast around a portion thereof.

In one embodiment the insert 504 may have a minimum average thickness of 0.2 mm and/or a minimum width of 0.1 mm and/or a minimum length of 0.1 mm. In another embodiment the insert 504 may have a minimum average thickness of 0.2 mm and/or a minimum width of 2 mm and/or a minimum length of 5 mm. In other embodiments the insert 504 may have a thickness ranging from about 0.1-20 mm, 0.1-6.0 mm, or 1.0-2.5 mm, or ranges therebetween.

Referring now to FIGS. 7-8, again the frictional surface 502 may have a plurality of peaks 510 and a plurality of valleys 512. The depth as indicated by line V of the valleys 512 may vary with embodiments. In various embodiments, the average of the depth V of the valleys 512 may range from about 1 µm-300 µm, 50 µm-260 µm, 100 µm-160 µm or variations of these ranges. However, for all cases there is local contact between the body 506 and the insert 504 during component operation for frictional damping to occur.

In other embodiments of the invention improvements in the frictional damping may be achieved by adjusting the thickness (L, as shown in FIG. 3) of the layer 520, or by adjusting the relative position of opposed frictional surfaces 502 or the average depth of the valleys 512 (for example, as illustrated in FIG. 2).

In one embodiment the insert 504 is not pre-loaded or under pre-tension or held in place by tension. In one embodiment the insert 504 is not a spring. Another embodiment of the invention includes a process of casting a material comprising a metal around an insert 504 with the proviso that the frictional surface 502 portion of the insert used to provide frictional damping is not captured and enclosed by a sand core that is placed in the casting mold. In various embodiments the insert 504 or the layer 520 includes at least one frictional surface 502 or two opposite friction surfaces 502 that are completely enclosed by the body 506 of the part. In another embodiment the layer 520 including the particles 514 or fibers that may be completely enclosed by the body 506 of the part or completely enclosed by the body 506 and the insert 504, and wherein at least one of the body 506 or the insert 504 comprises a metal or consists essentially of a metal. In one embodiment of the invention the layer 520 and/or insert 504 does not include or is not carbon paper or cloth.

Referring again to FIGS. 1-4, in various embodiments of the invention the insert 504 may include a first face 522 and an opposite second face 524 and the body 506 of the part may include a first inner face 526 adjacent the first face 522 of the insert 504 constructed to be complementary thereto, for example nominally parallel thereto. The body 506 of the part includes a second inner face 528 adjacent to the second face 524 of the insert 504 constructed to be complementary thereto, for example parallel thereto. The body 506 may include a first outer face 530 overlying the first face 522 of the insert 504 constructed to be complementary thereto, for example parallel thereto. The body 506 may include a first outer face 532 overlying the second face 524 of the insert 504 constructed to be complementary thereto, for example parallel thereto. However, in other embodiments of the invention the outer faces 530, 532 of the body 506 are not complementary to associated faces 522, 524 of the insert 504. When the damping means is provided by a narrow slot-like feature 508 formed in the body 506 of the part 500, the slot-like feature 508 may be defined in part by a first inner face 526 and a second inner face 528 which may be constructed to be complementary to each other, for example parallel to each other. In other embodiments the surfaces 526 and 528; 526 and 522; or 528 and 524 are mating surfaces but not parallel to each other.

Figure 11:
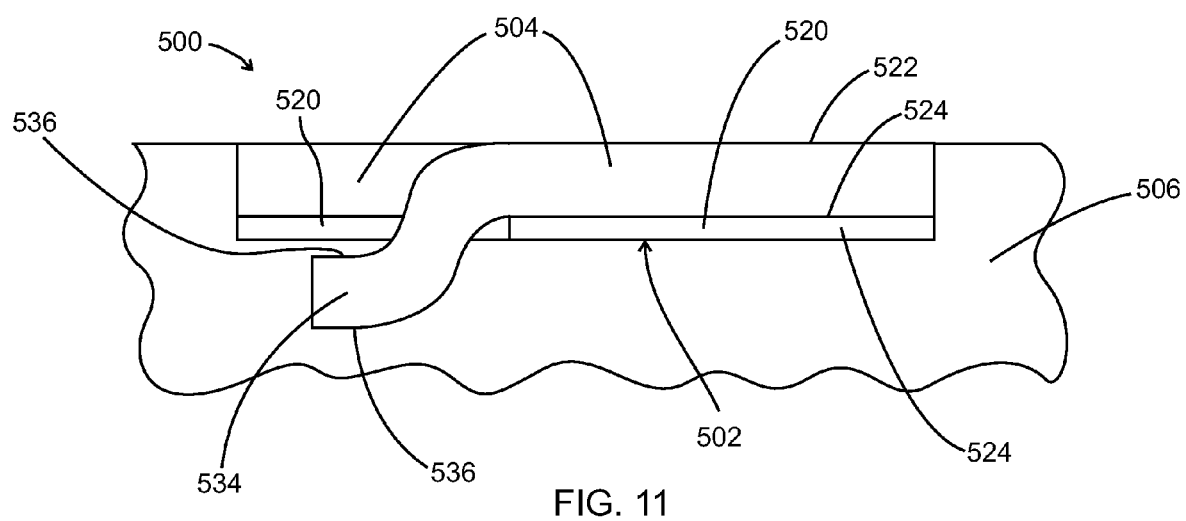
FIG. 11 is a sectional view with portions broken away of one embodiment of the invention.
Figure 12:
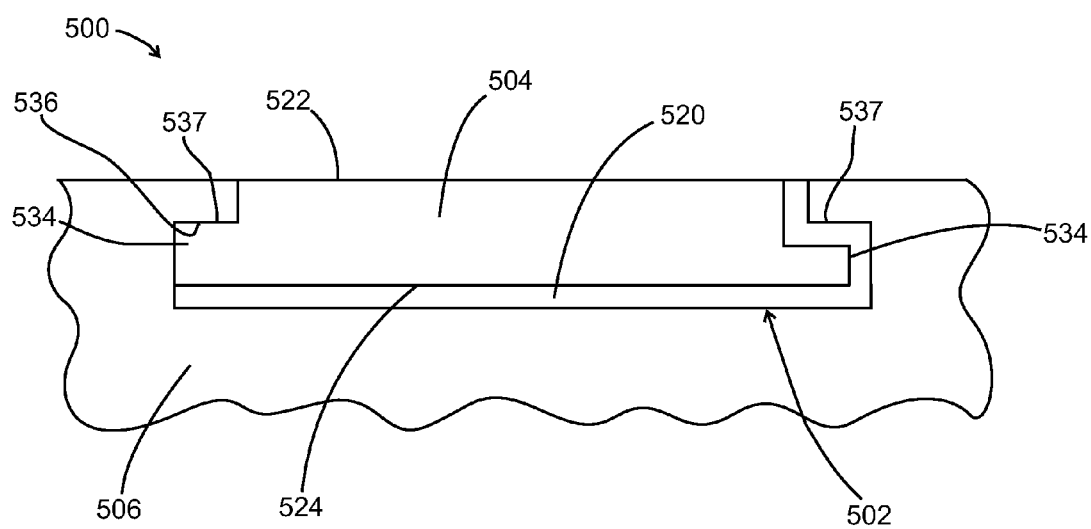
FIG. 12 is a sectional view with portions broken away of one embodiment of the invention.

Referring to FIGS. 11-12, in one embodiment of the invention the insert 504 may be an inlay wherein a first face 522 thereof is not enclosed by the body 506 of the part. The insert 504 may include a tang or tab 534 which may be bent downward as shown in FIG. 11. In one embodiment of the invention a wettable surface 536 may be provided that does not include a layer 520 including particles 514 or fibers, or a wettable material such as graphite is provided over the tab 534, so that the cast metal is bonded to the wettable surface 536 to attach the insert 504 to the body of the part but still allow for frictional damping on the non-bonded surfaces. A layer 520 including particles 514 or fibers may underlie the portion of the second face 524 of the insert 504 not used to make the bent tab 534.

In another embodiment the insert 504 includes a tab 534 which may be formed by machining a portion of the first face 522 of the insert 504 (FIG. 12). The tab 534 may include a wettable surface 536 having cast metal bonded thereto to attach the insert 504 to the body of the part but still allow for friction damping by way of the non-bonded surfaces. A layer 520 including particles 514 or fibers may underlie the entire second face 524 or a portion thereof. In other embodiments of the invention all surfaces including the tabs 534 may be non-wettable, for example by way of a coating 520 thereon, and features of the body portion 506 such as, but not limited to, a shoulder 537 may be used to hold the insert 504 in place.

Figure 13:
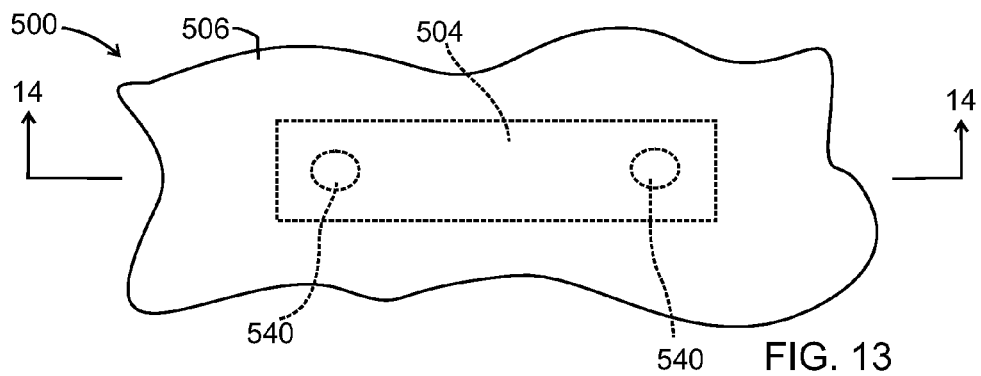
FIG. 13 is a plan view with portions broken away illustrating one embodiment of the invention.

Referring now to FIG. 13, one embodiment of the invention may include a part 500 having a body portion 506 and an insert 504 enclosed by the body part 506. The insert 504 may include through holes formed therein so that a stake or post 540 extends into or through the insert 504.

Figure 14:
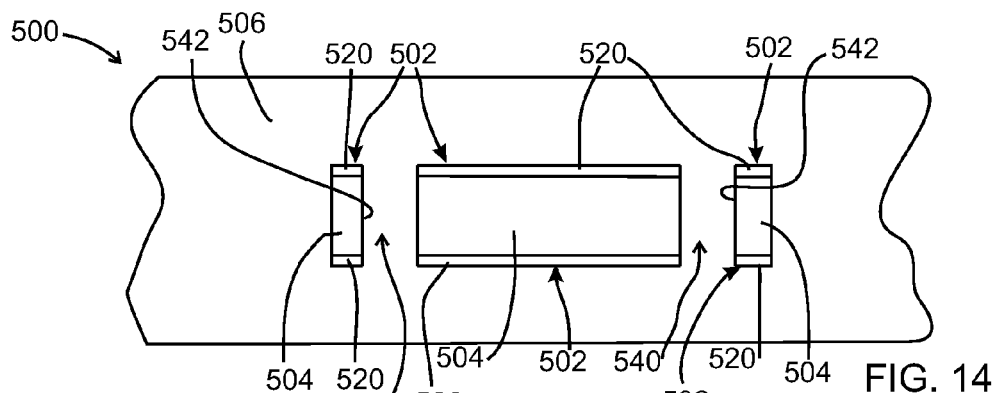
FIG. 14 is a sectional view taken along line 14-14 of FIG. 13 illustrating one embodiment of the invention.

Referring to FIG. 14, which is a sectional view of FIG. 13 taken along line 14-14, in one embodiment of the invention a layer 520 including a plurality of particles 514 or fibers (not shown) may be provided over at least a portion of the insert 504 to provide a frictional surface 502 and to prevent bonding thereto by cast metal. The insert 504 including the layer 520 may be placed in a casting mold and molten metal may be poured into the casting mold and solidified to form the post 540 extending through the insert 504. An inner surface 542 defining the through hole of the insert 504 may be free of the layer 520 or may include a wettable material thereon so that the post 540 is bonded to the insert 504. Alternatively, in another embodiment the post 504 may not be bonded the insert 504 at the inner surface 542. The insert 504 may include a feature such as, but not limited to, a shoulder 505 and/or the post 540 may include a feature such as, but not limited to, a shoulder 537 to hold the insert in place.

Figure 15:
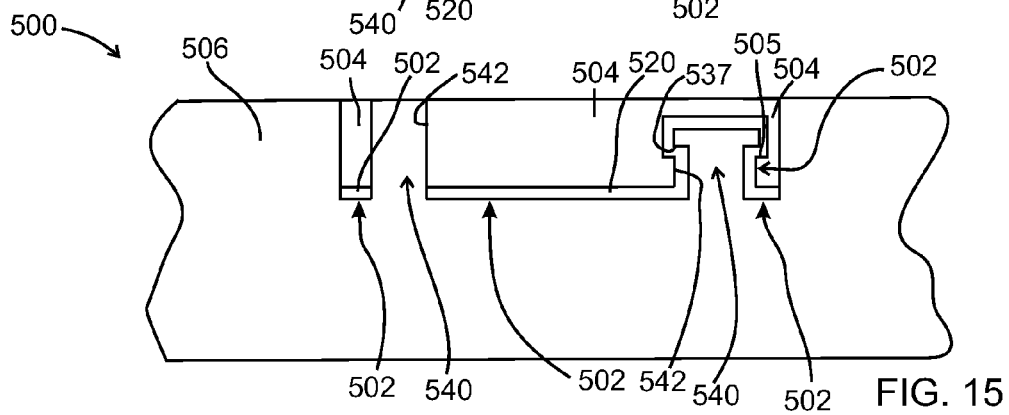
FIG. 15 is a sectional view with portions broken away illustrating one embodiment of the invention.

Referring now to FIG. 15, in another embodiment, the insert may be provided as an inlay in a casting including a body portion 506 and may include a post 540 extending into or through the insert 504. The insert 504 may be bonded to the post 540 to hold the insert in place and still allow for frictional damping. In one embodiment of the invention the insert 504 may include a recess defined by an inner surface 542 of the insert 504 and a post 540 may extend into the insert 504 but not extend through the insert 504. In one embodiment the post 504 may not be bonded to the insert 504 at the inner surface 542. The insert 504 may include a feature such as, but not limited to, a shoulder 505 and/or the post 540 may include a feature such as, but not limited to, a shoulder 537 to hold the insert in place.

Figure 16:
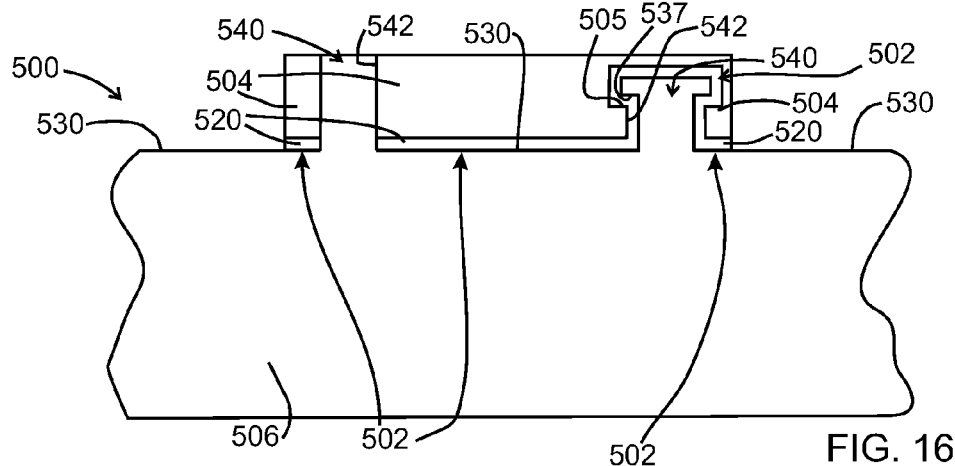
FIG. 16 is a sectional view, with portions broken away illustrating another embodiment of the invention.

Referring now to FIG. 16, in another embodiment of the invention, an insert 504 or substrate may be provided over an outer surface 530 of the body portion 506. A layer 520 may or may not be provided between the insert 504 and the outer surface 530. The insert 504 may be constructed and arranged with through holes formed therethrough or a recess therein so that cast metal may extend into or through the insert 504 to form a post 540 to hold the insert in position and still allow for frictional damping. The post 540 may or may not be bonded to the insert 504 as desired. The post 540 may extend through the insert 504 and join another portion of the body 506 if desired.

The frictional damping means as described herein may be used in a variety of applications, for example, in automotive parts such as brake rotors, brackets, pulleys, brake drums, transmission housings, gears, engines and engine components and other parts may undergo unwanted or undesirable vibrations, and may even produce noise that is transmitted into the passenger compartment of a vehicle. The frictional damping means may also be used to address undesirable vibrations in parts or components including, but not limited to, sporting equipment, housing appliances, manufacturing equipment such as lathes, mill/grinding/drilling machines, earth moving equipment, and other non-automotive applications, and components that are subject to dynamic loads and vibration. FIG. 17-32 are illustrative examples of such applications.

Figure 17:
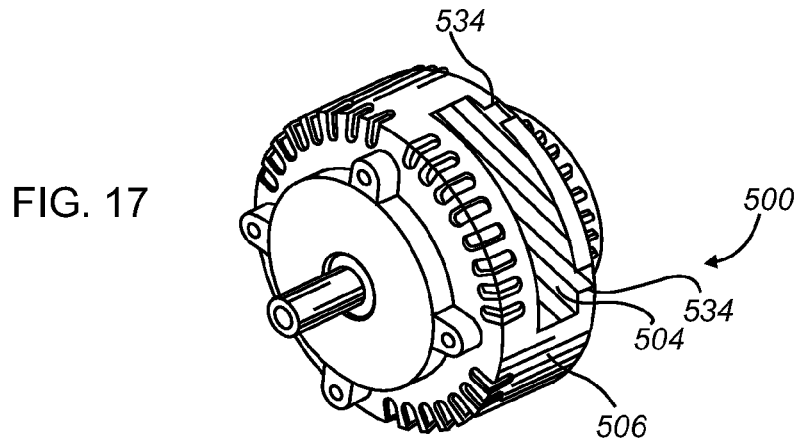
FIG. 17 is a schematic perspective view of an electric drive motor housing including an insert according to one embodiment of the invention.

Referring now to FIG. 17, one embodiment of the invention includes a product which may include an electric drive motor housing including a body portion 506 formed from a cast metal. An insert 504 may be included in the housing as an inlay, or completely enclosed in a wall of the housing. The insert 504 may include tabs 534 as desired. The body portion 506 may be bonded to the tabs 534 as described above.

Figure 18:
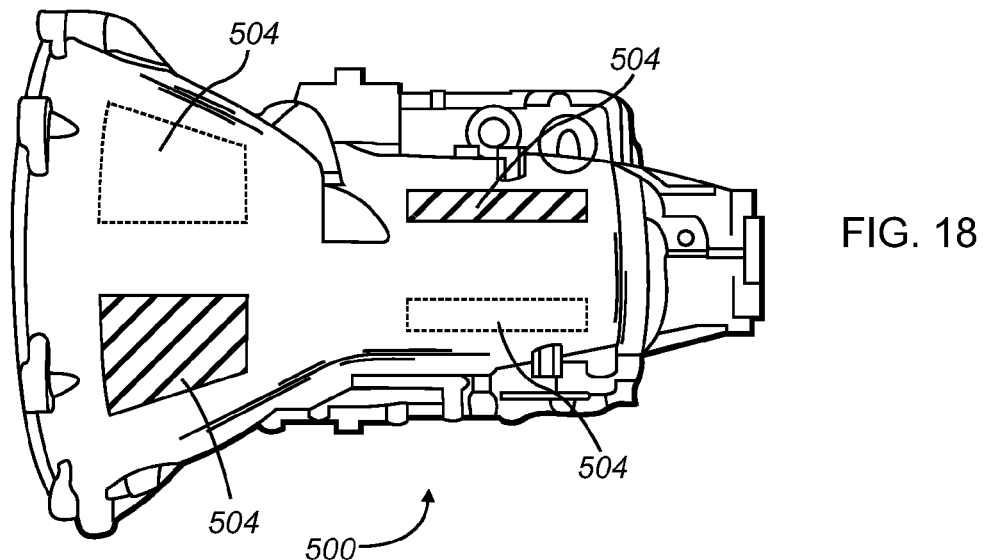
FIG. 18 is a schematic perspective view of a transmission housing including an insert according to one embodiment of the invention.

Referring now to FIG. 18, one embodiment of the invention may include a product 500 which may be a transmission housing including inserts 504 which may be completely enclosed by a wall of the transmission housing or may be provided as an inlay in the wall of the transmission housing according to various embodiments of the invention.

Figure 19:
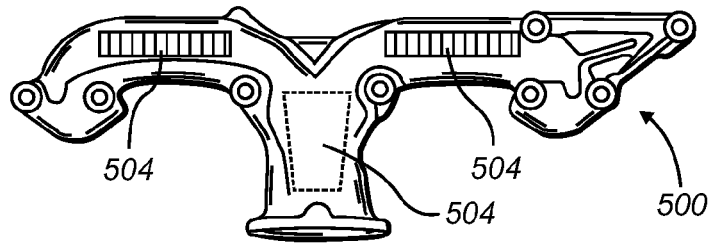
FIG. 19 is a schematic perspective view of a combustion engine exhaust gas manifold including an insert according to one embodiment of the invention.

Referring now to FIG. 19, one embodiment of the invention may include a product 500 which may be a combustion exhaust gas manifold including inserts 504 which may be completely enclosed or may be provided as an inlay in a wall forming the combustion engine exhaust gas manifold.

Figure 20:
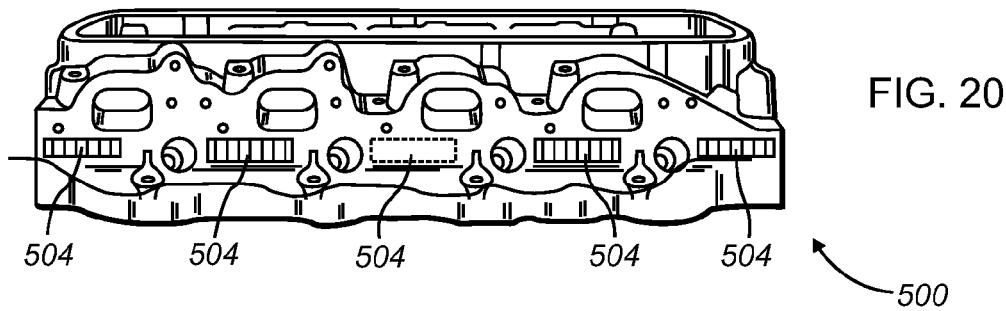
FIG. 20 is a schematic perspective view of a combustion engine cylinder head including an insert according to one embodiment of the invention.

Referring now to FIG. 20, one embodiment of the invention may include a product 500 which may be a combustion engine cylinder head including inserts 504 which may be completely enclosed or provided as an inlay in a wall of the cylinder head.

Figure 21:
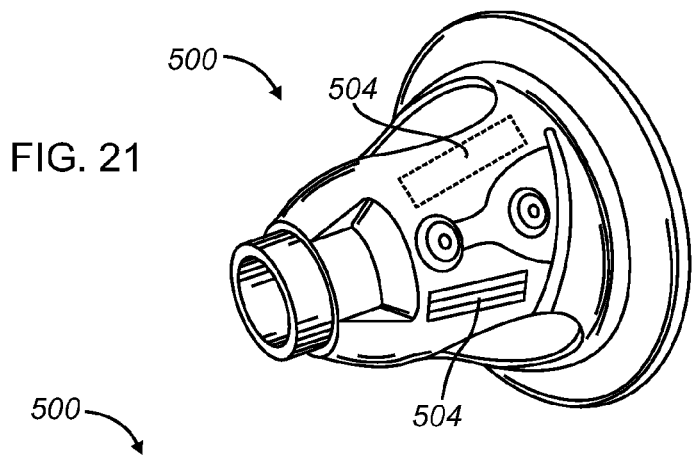
FIG. 21 is a schematic perspective view of a differential including an insert according to one embodiment of the invention.

Referring now to FIG. 21, one embodiment of the invention may include a product 500 which may be a differential case including inserts 504 which may be completely enclosed or provided as an inlay in a wall of the differential case.

Figure 22:
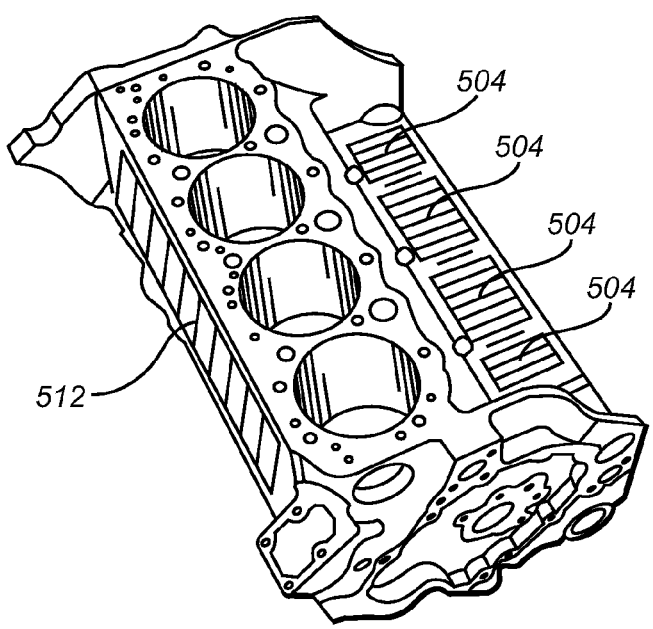
FIG. 22 is a schematic perspective view of a combustion engine block including an insert according to one embodiment of the invention.

Referring now to FIG. 22, one embodiment of the invention may include a product 500 which may be an engine block including inserts 504 which may be completely enclosed or provided as an inlay in a wall of the engine block.

Figure 23:
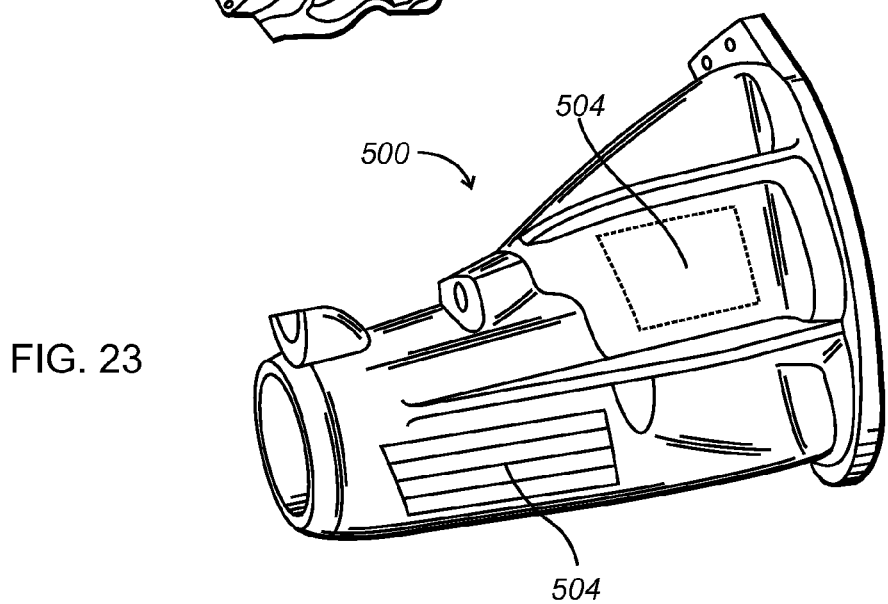
FIG. 23 is a schematic perspective view of a rear end housing including an insert according to one embodiment of the invention.

Referring now to FIG. 23, one embodiment of the invention may include a product 500 which may be a rear end housing for a rear wheel drive vehicle including at least one insert 504 which may be completely enclosed or may be provided as an inlay in a wall of the rear end housing.

Figure 24:
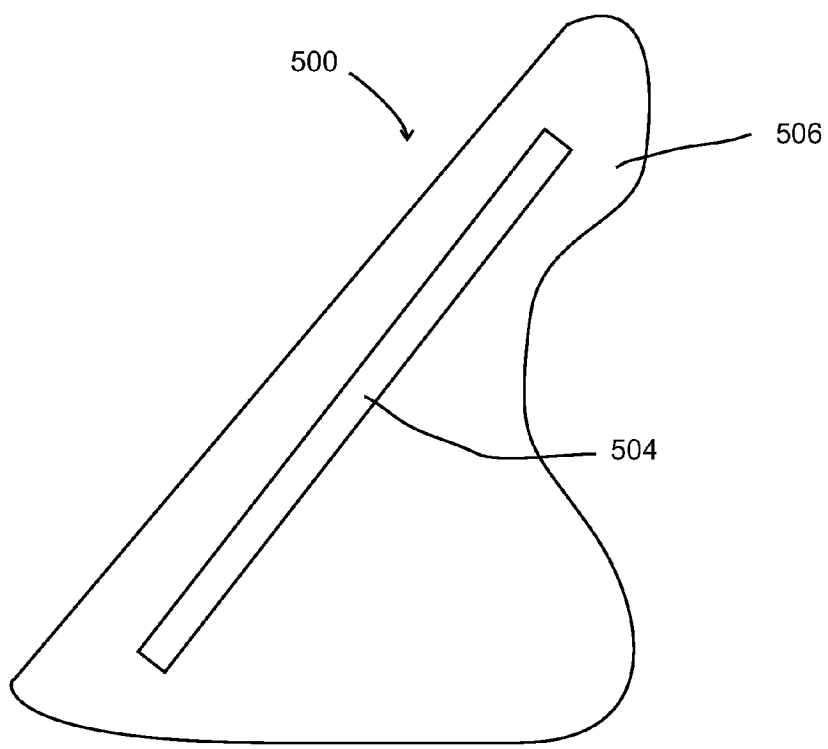
FIG. 24 is a sectional view of the head of a golf club according to one embodiment of the invention.

Referring now to FIG. 24, one embodiment of the invention may include a product 500 which may include a head of a golf club iron which may include an insert 504 therein for providing frictional damping according to one embodiment of the invention. The golf club may include a shaft attached to the head and the insert 504 may be provided in the shaft in addition to or alternatively to providing the insert 504 in the head of the golf club. The insert 504 may provide a frictional damping means to reduce vibration of the head and/or the shaft when the club strikes a golf ball or the ground.

Figure 25:
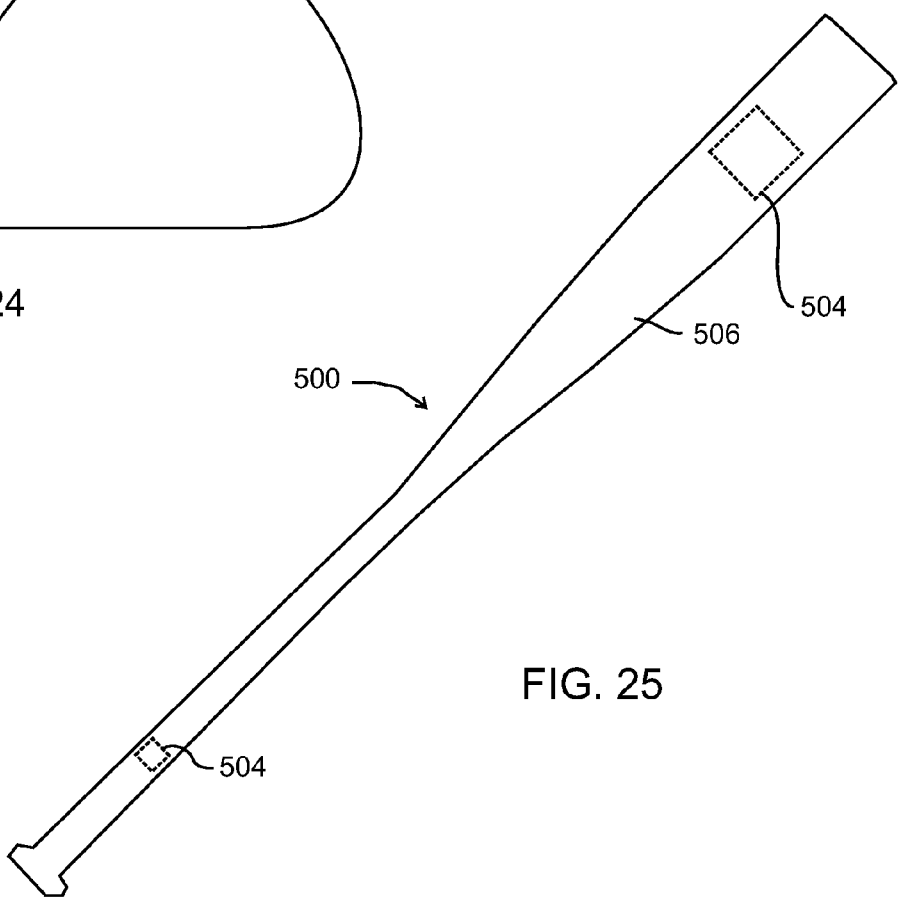
FIG. 25 is a perspective view of a baseball bat including an insert according to one embodiment of the invention.

Referring now to FIG. 25, one embodiment of the invention may include a product 500 which may be in the form of a metal baseball bat including an insert 504 as a frictional damping means. The frictional damping means may reduce the vibration of the baseball bat upon striking an object such as a baseball.

Figure 26:
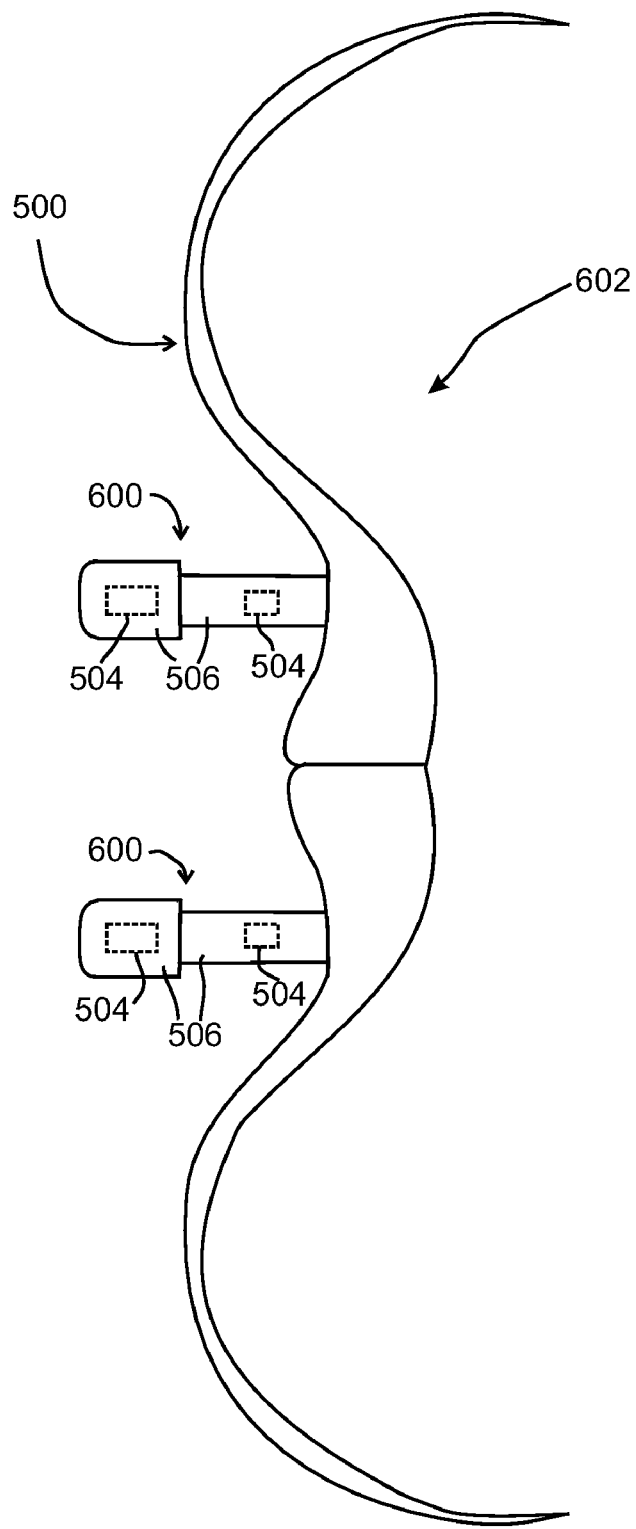
FIG. 26 illustrates an archery bow including stabilizers including an insert.

Referring now to FIG. 26, one embodiment of the invention may include a stabilizer(s) 600 for an archery bow 602 which may comprise a metal and may include a frictional damping means such as an insert 504 in the body portion 506 of the stabilizer 600 to reduce the vibration of the bow and/or the bow string (not shown) which may occur when shooting an arrow with the bow.

Figure 27:
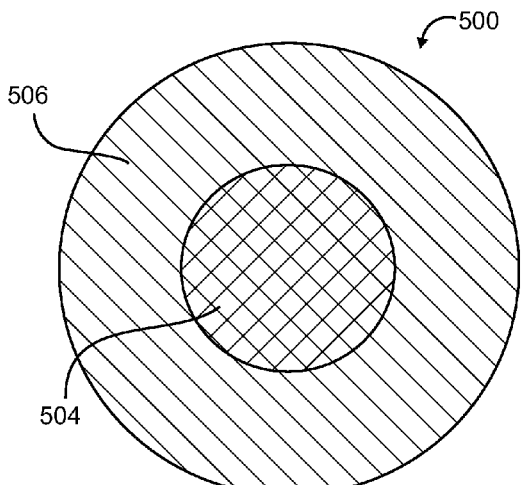
FIG. 27 is a sectional view of a shaft including a frictional damping means, an insert as a core and a surrounding metal layer.

Referring now to FIG. 27, one embodiment of the invention may include a shaft 500 including a frictional damping means which may include an insert 504 as a central core and concentric metal layer as a body portion 506. The insert 504 and the body portion 506 may be keyed to each other so that they rotate together.

Figure 28:
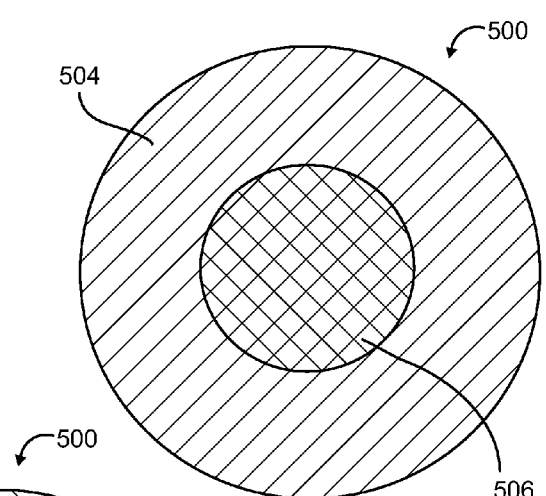
FIG. 28 is a sectional view illustrating a shaft having a metal core and a frictional damping means including an insert surrounding the core.

Referring now to FIG. 28, one embodiment of the invention may include a shaft 500 having a central metal core as a body portion 506 and a frictional damping means which may include a concentric insert 504 surrounding the body portion 506. The insert 504 and the body portion 506 may be keyed to each other so that they rotate together.

Figure 29:
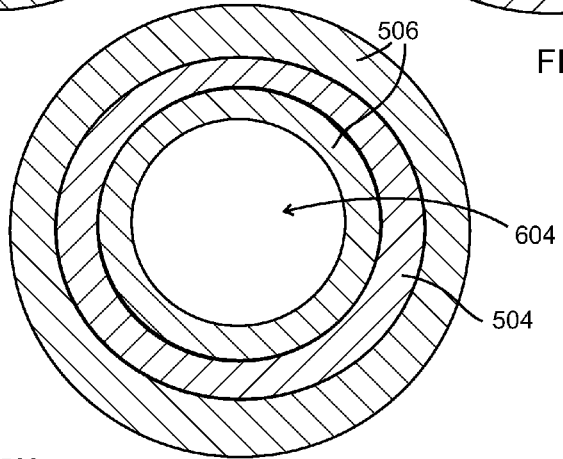
FIG. 29 is a sectional view of a bearing including a frictional damping means including an insert surrounded by a metal body.

Referring now to FIG. 29, one embodiment of the invention may include a bearing 500 including a frictional damping means which may include a cylindrical insert 504 surrounded by an inner and outer concentric body portion 506 which may be made of a metal. The bearing 500 may have a bore 604 extending therethrough to receive a shaft therein. A shaft rotating in the bearing 500 may have a destructive resonance frequency which could result in damage to the part in which the bearing 500 is located. The insert 504 provides a frictional damping means to dissipate undesirable vibration or osculation of the shaft.

Figure 30:
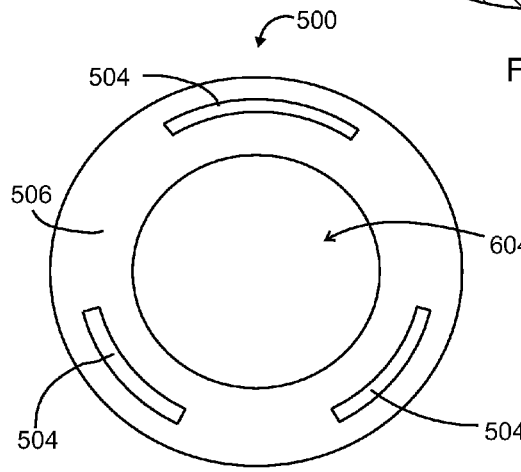
FIG. 30 is a sectional view illustrating a bearing including a three lobe insert frictional damping means.
Figure 31:
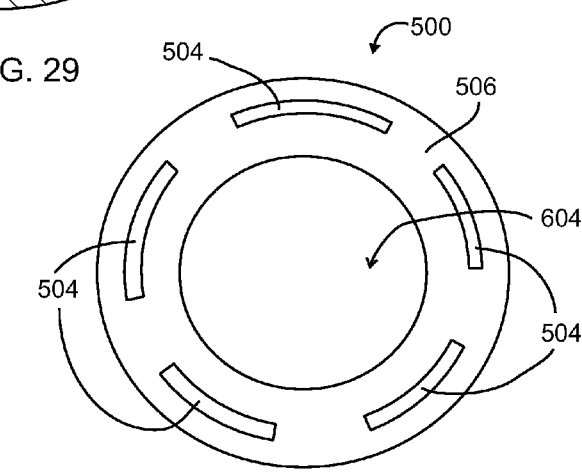
FIG. 31 is a sectional view of a bearing including a five lobe insert frictional damping means.

Referring now to FIG. 30, another embodiment of the invention may include a bearing 500 including a frictional damping means which may include three lobe inserts 504 which may be positioned at 60 degrees with respect to each other or at an equal distance from each other. The inserts 504 may serve to reduce the vibration or osculation of a shaft spinning in the bore 604 of the bearing. Similarly, as illustrated in FIG. 31, another embodiment may include a bearing 500 having five lobe inserts 504 equally spaced from each other.

Figure 32:
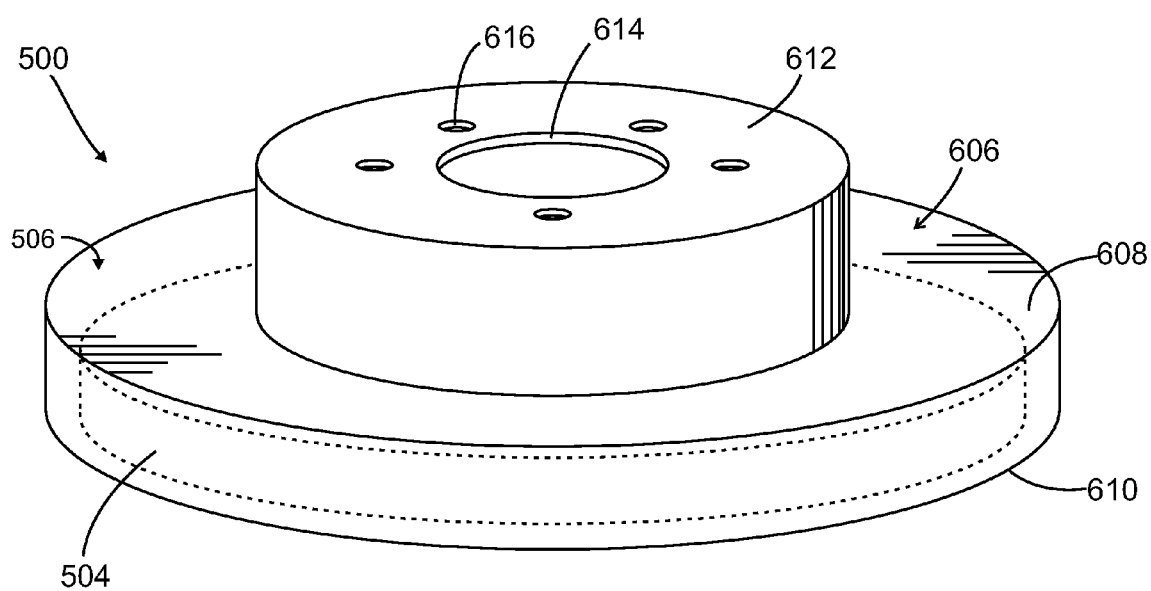
FIG. 32 is a schematic perspective view of a vehicle brake rotor including a frictional damping means according to one embodiment of the invention.

Referring now to FIG. 32, one embodiment of the invention may include a vehicle brake rotor 500 which may include a body portion 506 which may be a brake rotor cheek 606 having a first flat face 608 and an opposite flat face 610 for engagement with a brake pad. The brake rotor includes a frictional damping means which may include an insert 504 received in the brake cheek 606. The vehicle brake rotor 500 may include a hub portion 612 attached to the cheek 606. The hub portion 612 may include a central aperture 614 and a plurality of bolt holes 616 for attaching the brake rotor to a vehicle drive system.

Another embodiment of the invention includes a machine such as a stamping machine, band saw, drill or the like which includes a wall comprising a metal which is vibrated during operation of the machine, and wherein the wall includes a friction damping means including but not limited to an insert, as described above.

When the term "over," "overlying," "overlies," "under," "underlying," or "underlies" is used herein to describe the relative position of a first layer or component with respect to a second layer or component such shall mean the first layer or component is directly on and in direct contact with the second layer or component or that additional layers or components may be interposed between the first layer or component and the second layer or component.

The above description of embodiments of the invention is merely exemplary in nature and, thus, variations thereof are not to be regarded as a departure from the spirit and scope of the invention.

What is claimed is:

1. A product comprising:
   a body portion comprising cast metal portion and a frictional damping means to damp vibration of the body portion cast-in-place by the cast metal portion comprising at least a first frictional surface, a first frictional surface comprising a surface of the body portion, a surface of an insert, a surface of a layer comprising particles or fibers on the insert, and wherein the insert is not pre-loaded, and wherein the insert is enclosed by the cast metal portion the body portion or the cast metal portion extends into or through the insert or a portion of the insert is bonded to the cast metal portion.

2. A product as set forth in claim 1 wherein the first frictional surface is defined in the body portion.

3. A product as set forth in claim 2 further comprising a second frictional surface defined by the body portion.

4. A product as set forth in claim 1 wherein the first frictional surface is a surface of the insert.

5. A product as set forth in claim 1 wherein the first frictional surface is a surface of the layer.

6. A product as set forth in claim 5 wherein the first frictional surface is a surface of the layer, and wherein the layer comprising the plurality of particles.

7. A product as set forth in claim 6 wherein the layer further comprises a binder.

8. A product as set forth in claim 1 wherein the product comprises an electric motor drive housing.

9. A product as set forth in claim 1 wherein the product comprises a transmission housing.

10. A product as set forth in claim 1 wherein the product comprises a rear end housing for a vehicle drive system.

11. A product as set forth in claim 1 wherein the product comprises an engine block.

12. A product as set forth in claim 1 wherein the product comprises a differential case.

13. A product as set forth in claim 1 wherein the product comprises a combustion engine exhaust manifold.

14. A product as set forth in claim 1 wherein the product comprises a combustion engine cylinder head.

15. A product as set forth in claim 1 wherein the product comprises the head of a golf club.

16. A product as set forth in claim 1 wherein the product comprises a baseball bat.

17. A product as set forth in claim 1 wherein the product comprises an archery bow.

18. A product as set forth in claim 1 wherein the product comprises a device used in a sport.

19. A product as set forth in claim 1 wherein the product comprises a machine.

20. A product as set forth in claim 4 wherein the insert has a minimum average thickness of 0.5 mm and a minimum width of 0.5 mm.

21. A product as set forth in claim 4 wherein the insert has a thickness ranging from about 0.5-3.5 mm.

22. A product as set forth in claim 3 wherein each of the first frictional surface and the second frictional surface comprises a plurality of peaks and valleys and wherein the valleys have an average depth ranging from about 1 mm to about 300 mm.

23. A product as set forth in claim 1 wherein the particles or fibers have a bonding property such that the particles or fibers may bind to each other under compression.

24. A product as set forth in claim 6 further comprising a coating on the particles or fibers.

25. A product as set forth in claim 6 wherein the particles or fibers are treated to provide functional groups thereon.

26. A product as set forth in claim 1 further comprising a plurality of particles or fibers embedded in the body portion.

27. A product as set forth in claim 4 further comprising a plurality of particles or fibers embedded in the insert.

28. A product as set forth in claim 6 wherein each particle or fiber having a length along the longest dimension thereof ranging from about 1 μm-300 μm.

29. A product as set forth in claim 6 further comprising a organic binder.

30. A product as set forth in claim 6 further comprising a polymeric binder comprising at least one of epoxy resins, phosphoric acid binding agent, calcium aluminates, sodium silicates, wood flour or clay.

31. A product as set forth in claim 6 further comprising an inorganic binder.

32. A product as set forth in claim 1 wherein the product comprises a vehicle brake rotor.

33. A product as set forth in claim 1 wherein the product comprises a shaft.

34. A product as set forth in claim 1 wherein the product comprises a bearing.

35. A product as set forth in claim 5 wherein the layer includes at least one of aluminum or silica particles and a binder.

36. A product as set forth in claim 35 wherein the binder comprises lignosulfanate.

37. A product as set forth in claim 4 wherein the insert includes at least one tab having a wettable surface and the body portion being bonded thereto.

38. A product as set forth in claim 4 wherein the insert comprises at least one of aluminum, steel, stainless steel, cast iron or a metal matrix composite.

39. A product as set forth in claim 3 wherein a slot feature is provided between the first frictional surface and the second frictional surface.

40. A product as set forth in claim 5 wherein the layer has a thickness ranging from about 1 μm-300 μm.

41. A product as set forth in claim 6 wherein the particles or fibers do not become eroded at a temperature of 2400° F. or less.

42. A product as set forth in claim 6 wherein the particles or fibers do not become eroded at a temperature of 2700° F. or less.

43. A product as set forth in claim 6 wherein the particles and fibers provide a plurality of peaks for making contact with one of the body portion or the insert.

44. A product as set forth in claim 4 wherein the insert is not preloaded, under pre-tension or held in place by tension.

45. A product as set forth in claim 4 wherein the insert is not a spring.

46. A product as set forth in claim 4 wherein the insert is completely enclosed by the body portion.

47. A product as set forth in claim 4 wherein the insert is constructed and arranged as an inlay in the body portion.

48. A product as set forth in claim 4 wherein the insert is over an outer surface of the body portion.

49. A product as set forth in claim 4 wherein the insert includes a first face and an opposite second face, and wherein the body portion includes a first inner face adjacent the first face of the insert constructed and arranged to be complementary thereto.

50. A product as set forth in claim 49 wherein the first face of the insert and the first face of the body portion are parallel to each other.

51. A product as set forth in claim 4 wherein the insert includes a tab including a bent portion and wherein the bent portion of the tab includes at least one wettable surface and wherein the body portion is bonded to the wettable surface.

52. A product as set forth in claim 4 wherein the insert includes a tab including a bent tab portion.

53. A product as set forth in claim 4 wherein the insert includes at least one throughhole and wherein the body portion includes a post extending through the throughhole.

54. A product as set forth in claim 4 wherein the insert has a recess formed therein and wherein the body portion comprises a post extending onto the recess.

55. A product as set forth in claim 53 wherein the post is bonded to the insert.

56. A product as set forth in claim 1 wherein the body portion comprises cast iron and the insert comprises stainless steel.

57. A product as set forth in claim 1 wherein the frictional surface provides an area over which frictional contact may occur during frictional damping of the part, the area extending in a first direction a minimum distance of 0.1 mm and extending in a second direction a minimum distance of 0.1 mm.

58. A product as set forth in claim 1 wherein the insert comprises a shoulder constructed and arranged to engage the body portion to hold the insert in place.

59. A product comprising:
a body portion comprising a cast metal portion and frictional damping means comprising an insert and wherein the insert is at least partially held in place by a portion of the cast metal portion extending into the insert, through the insert or over a shoulder of the insert, and wherein the insert and the body portion have surfaces for frictional movement with respect to each other to damp vibrations of the body portion.

60. A product as set forth in claim 59 wherein the insert comprises a shoulder constructed and arranged to engage the body portion to hold the insert in place.

* * * * *